Feb. 27, 1951     H. G. McGRATH     2,543,038
SELECTIVE HYDROGENATION OF ALDEHYDES
Filed Dec. 30, 1947
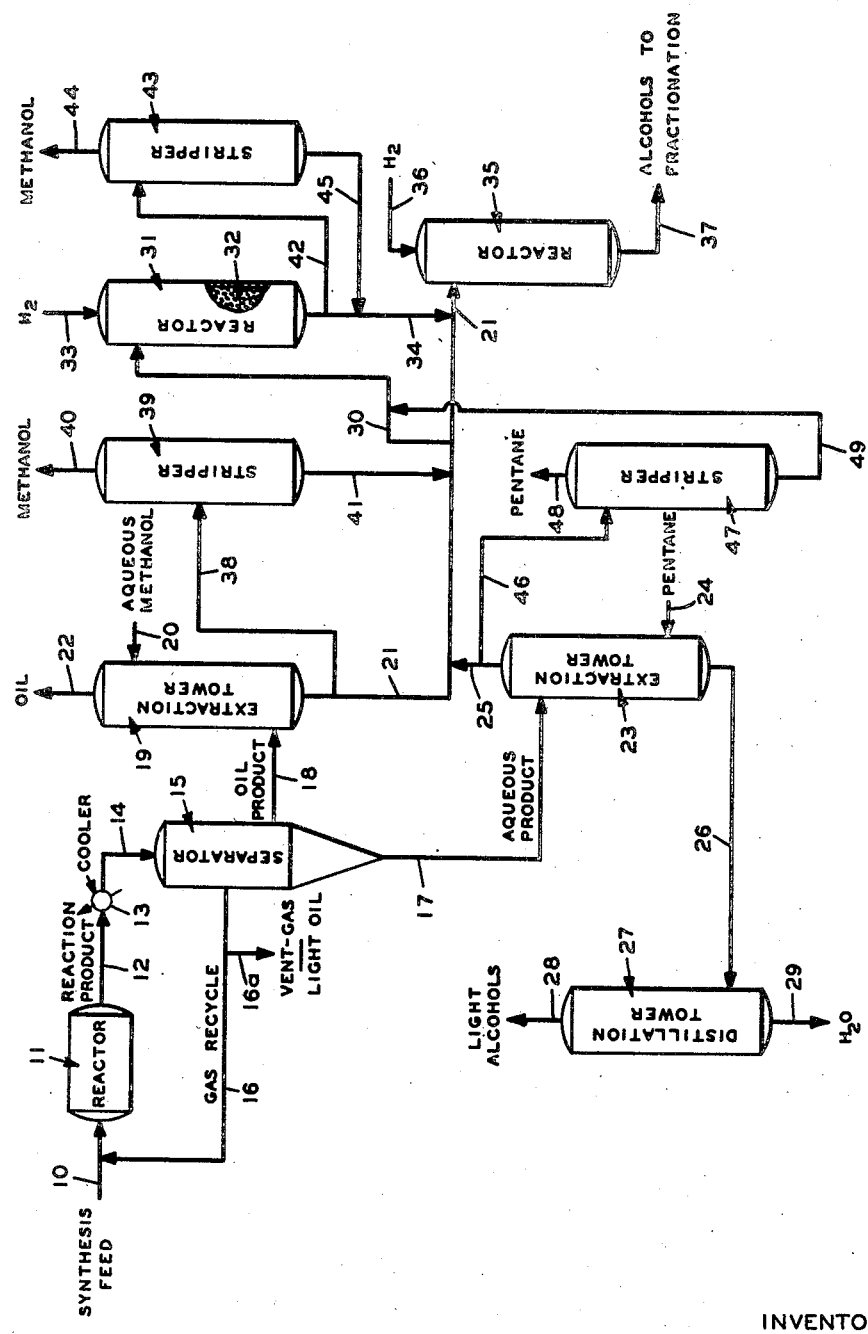
INVENTOR
HENRY G. McGRATH
BY E. F. Liebrecht
Benjamin J. Kaufman
ATTORNEYS Patented Feb. 27, 1951

2,543,038

UNITED STATES PATENT OFFICE 2,543,038

SELECTIVE HYDROGENATION OF ALDEHYDES

Henry G. McGrath, Elizabeth, N. J., assignor to The M. W. Kellogg Company, Jersey City, N. J., a corporation of Delaware Application December 30, 1947, Serial No. 794,651

11 Claims. (Cl. 260—450)

This invention relates to the hydrogenation of oxygenated organic compounds and relates more particularly to a method for the selective hydrogenation of aldehydes in the presence of ketones, wherein aldehydes are converted to alcohols. Still more particularly, the invention relates to a method for the selective hydrogenation of aldehydes to alcohols in the presence of ketones, wherein aldehydes and ketones are obtained as products from the catalytic hydrogenation of oxides of carbon.

It is well known, that aldehydes and ketones may be converted to alcohols by reduction or catalytic hydrogenation. For example, aldehydes and ketones may be converted to primary and secondary alcohols, respectively, when treated with appropriate reducing agents, such as the metals in acid solution, or by passage with hydrogen over catalysts such as copper, silver, or nickel. It has been found, however, that in attempting to selectively hydrogenate aldehydes to alcohols in the presence of ketones, great difficulty is encountered by reason of the similarity of respective hydrogenation conditions of temperature and pressure employed in converting aldehydes and ketones to alcohols. Hence, based on the known fact that similar hydrogenation conditions of temperature and pressure are required in converting ketones to alcohols, and aldehydes to alcohols, a satisfactory method for selectively hydrogenating aldehydes to alcohols in the presence of ketones, without substantial hydrogenation of the ketones, has not been found.

A satisfactory method for selectively hydrogenating an aldehyde to an alcohol in the presence of a ketone without substantially hydrogenating the ketone, has been found to be especially desirable in processes for the catalytic hydrogenation of oxides of carbon at elevated temperatures in which mixtures of oxygenated organic compounds, comprising aldehydes, ketones, esters and acids are obtained as reaction products in the vapor state in the form of reactor outlet gases. These gases are generally passed through one or more condensation zones in which they are cooled to temperatures within the range from about 40° F. to about 150° F. The resulting condensate then separates into a hydrocarbon-rich phase and a water-rich phase, each phase containing the aforementioned oxygenated organic compounds. In treating the respective phases for the extraction of the aforementioned oxygenated organic compounds, it has been found highly desirable to selectively hydrogenate aldehydes present to alcohols without simultaneous substantial hydrogenation of ketones, after isolating the individual or combined extracted mixtures of aldehydes, ketones, esters, and acids. In this respect, it has been found that the failure of economically eliminating aldehydes present in the aforementioned mixtures, may result in aldehyde polymerization or acetal formation, making subsequent separation of these compounds from aldehydes present, exceedingly difficult.

It is, therefore, an object of this invention to provide a method for the selective hydrogenation of aldehydes to alcohols in the presence of ketones, without effecting substantial hydrogenation of the ketones.

Another object of the invention is to provide a method for the selective hydrogenation of aldehydes to alcohols in the presence of ketones without effecting substantial hydrogenation of ketones, wherein these aldehydes and ketones are present as components in mixtures of oxygenated organic compounds obtained as products in the catalytic hydrogenation of oxides of carbon at elevated temperatures.

Other objects and advantages inherent in the invention will be apparent from the following detailed disclosure.

I have found that I may selectively hydrogenate aldehydes in the presence of ketones to convert the aldehydes to alcohols, without substantial hydrogenation of the ketones, by subjecting a mixture comprising aldehydes and ketones to selective hydrogenation at a temperature between about 75° F. and about 575° F. and at a pressure between about 15 and about 2000 pounds per square inch absolute in the presence of a hydrogenation catalyst. Such hydrogenation catalyst may comprise a metal having an atomic number greater than 23. Preferably, I may use such catalysts as copper oxide, chromium oxide, copper chromite, zinc oxide, zinc chromite, nickel, ruthenium, molybdenum, silver, platinum, cobalt, and iron. In accordance with the aforementioned broad conditions of temperature and pressure ranges, I have found that within somewhat narrower definite limits, individual catalysts or mixtures comprising catalysts, selected from those mentioned above will produce better results when used within these ranges in selectively hydrogenating aldehydes to alcohols in the presence of ketones. For example, I have found, as indicated by the data hereinafter disclosed, that where the catalyst in the aforementioned method, comprises a mixture of copper oxide and chromium oxide and containing substantial proportions of each oxide, such as a copper oxide-chromium oxide catalyst in the ratio of 1:2, it is more desirable to selectively hydrogenate aldehydes at a temperature between about 200° F. and about 225° F. and at a pressure between about 300 and about 500 pounds per square inch absolute. Where the catalyst comprises a mixture of zinc oxide and chromium oxide, with substantial proportions of each oxide present, such as a zinc oxide-chromium oxide catalyst in the ratio of 1:2, optimum conditions for selective aldehyde hydrogenation have been found to occur at a temperature between about 250° F. and about 300° F. and at a pressure between about 400 and about 600 pounds per square inch absolute. In instances where the catalyst comprises iron, it is preferable to selectively hydrogenate aldehydes present in the aforementioned aldehyde ketone mixture, at a temperature between about 200° F. and about 350° F. and at a pressure between about 300 and about 500 pounds per square inch absolute. Individual catalysts, for the selective hydrogenation of aldehydes to alcohols, comprising copper oxide, chromium oxide, or any of the aforementioned catalysts or their mixtures may be efficiently utilized in accordance with the process of the invention within the aforementioned broad temperature range, namely, between about 75° F. and about 575° F. and the broad pressure range, namely, between about 15 and about 2000 pounds per square inch absolute. The particular catalyst or mixture of catalysts, may be present as a fixed-bed, fluid-bed or as a slurry, although I prefer to use a fixed-bed catalyst.

It should be noted that where the aldehyde-ketone mixture also contains other oxygenated organic compounds such as esters or acids, no additional difficulty is encountered in selectively hydrogenating the aldehydes in the presence of ketones and the other oxygenated compounds. This is based on the fact that relatively more severe hydrogenation conditions of temperature and pressure are required in converting esters and acids to alcohols than are required for the conversion of aldehydes and ketones to alcohols. Hence, the process of the invention may be successfully applied in selectively hydrogenating aldehydes to alcohols in the presence of ketones, even though there may be other oxygenated organic compounds present.

The accompanying drawing illustrates, diagrammatically, one form of the apparatus employed and capable of carrying out one embodiment of the process of the invention, wherein it is desired to selectively hydrogenate aldehydes to alcohols in the presence of ketones, without effecting simultaneous substantial hydrogenation of the ketones, and wherein aldehydes and ketones are present as components of mixtures of oxygenated organic compounds obtained as products in the catalytic hydrogenation of oxides of carbon at elevated temperatures.

While the invention will be described in detail by reference to one embodiment of the process employing the apparatus illustrated in the drawing, it should be noted that it is not intended that the invention be limited to the embodiment as illustrated, but is capable of other embodiments which may extend beyond the scope of the apparatus illustrated. Some of the mechanical elements necessary to effect the transfer of liquids and vapors and to maintain the conditions of temperature and pressure necessary to carry out the function of the apparatus are omitted in order to simplify the description. It will be understood, however, that much equipment of this nature is necessary and will be supplied by those skilled in the art.

Referring to the drawing, a synthesis feed comprising a reaction mixture of hydrogen and an oxide of carbon, at varying mol ratios such as 2:1, is supplied through line 10 and transferred through this line to a synthesis reaction vessel, represented in the drawing by reactor 11. In reactor 11 the reaction mixture is contacted with a hydrogenation catalyst, such as a reduced iron or cobalt catalyst, at temperatures varying between about 300° F. and about 700° F., and at pressures varying between about atmospheric pressure and about 500 pounds per square inch, and is carried out according to conventional fixed bed or fluid bed operations. The resulting reaction product obtained from reactor 11 is withdrawn through line 12. This product is in the vapor form, substantially as it comes from the reactor within the aforementioned temperature range, containing water, hydrocarbons, and oxygenated organic compounds comprising aldehydes, ketones, esters, acids, and alcohols, and is first cooled to condense substantially large quantities of normally liquid components. Conveniently, condensation may be effected in a plurality of cooling stages which are represented diagrammatically in the drawing by cooler 13 with which line 12 connects. From cooler 13, the resulting mixture of condensate and uncondensed gases passes through line 14 to a separator 15. In the latter, uncondensed gases are withdrawn through line 16 and recycled through this line to the synthesis feed in line 10, with which line 16 connects. Vent-gas and uncondensed light oil may be withdrawn through line 16a. The condensate in separator 15 separates as a lower aqueous phase and an upper oil phase. The aqueous phase is drawn off from the bottom of separator 15 through line 17, and the oil phase is drawn off at an intermediate point through line 18. It should be noted that apparatus embodying more than one separation stage may be employed, if desired; for example, primary and secondary stages may be introduced, operating successively and respectively at temperatures of about 150° F. and about 100° F.

The oil product liquid phase withdrawn from separator 15 through line 18, comprises a hydrocarbon-rich mixture containing oxygenated organic compounds consisting of aldehydes, ketones, esters, acids, and alcohols. This oil product, or a fractionated portion thereof boiling within the range from about 150° F. to about 400° F., is next subjected to extraction treatment with a hydrocarbon-insoluble alcohol treating agent, such as methanol, ethanol, or propanol, to extract the aforementioned oxygenated compounds from the oil, the particular alcohol treating agent selected having a boiling point lower than that of the oxygenated compounds subjected to extraction. For this purpose the aforementioned hydrocarbon-rich mixture is transferred through line 18 to a low point in an extraction tower 19. In tower 19 the mixture introduced through line 18 is subjected to intimate countercurrent contact with one or more of the aforementioned hydrocarbon-insoluble alcohol treating agents, such as methanol, which is introduced into tower 19 through line 20. The methanol treating agent and the mixture of hydrocarbons and oxygenated organic compounds are contacted in tower 19 under conditions effective to absorb in the methanol substantially all of the oxygenated organic compounds present. The extract thus produced, comprising a mixture of the methanol treating agent and other oxygenated organic compounds, namely, aldehydes, ketones, esters, acids, and alcohols, is withdrawn from the bottom of tower 19 through line 21 for further treatment in the process hereinafter described. The separated hydrocarbon or oil layer in tower 19 may be withdrawn overhead through line 22 for further use or treatment outside the scope of the present process.

The aqueous liquid phase withdrawn from separator 15 through line 17, comprises a water-rich mixture containing oxygenated organic compounds consisting of aldehydes, ketones, esters, acids, and alcohols. This aqueous product is next subjected to extraction treatment with a water-insoluble solvent, such as a relatively low boiling hydrocarbon or an ether, to extract the aforementioned oxygenated organic compounds from their aqueous solution. For this purpose, the aforementioned water-rich mixture is transferred through line 17 to an intermediate point in an extraction tower 23. In tower 23 the mixture introduced through line 17 is subjected to intimate countercurrent contact with a suitable water-insoluble solvent such as a relatively low-boiling hydrocarbon which may be propane, butane, or pentane. Pentane being preferred in the present embodiment of the process of the invention is introduced at a low point in tower 23 through line 24. The pentane treating agent and the water-rich mixture of oxygenated organic compounds are contacted in tower 23 under conditions effective to absorb in the treating agent substantially all of the oxygenated organic compounds present. The extract thus produced, comprising a mixture of the pentane treating agent and the aforementioned oxygenated organic compounds, namely, aldehydes, ketones, esters, acids, and alcohols, is withdrawn overhead from tower 23 through line 25 for further treatment in the process hereinafter described. Bottoms from tower 23 comprising substantially water and unextracted light alcohols, are withdrawn and transferred through line 26 to a distillation tower 27. Tower 27 is operated under conditions of temperature and pressure effective to distill overhead the aforementioned light alcohols, substantially water-free, which are withdrawn through line 28 for further use or treatment outside the scope of the present process. Remaining quantities of water in tower 27 are withdrawn as bottoms through line 29.

As indicated above, the extract phase from tower 19, comprising a mixture of the methanol treating agent and the aforementioned oxygenated organic compounds is withdrawn through line 21, while the extract from tower 23 also comprising a mixture of oxygenated organic compounds and the pentane treating agent, is withdrawn through line 25. These extracts are next subjected to selective hydogenation, either individually or combined, in order to convert aldehydes present to alcohols, without simultaneous substantial hydrogenation of ketones and other oxygenated organic compounds present. For this purpose, the extract phase from tower 19, withdrawn through line 21, may be transferred through line 30, with which line 21 connects, to a hydrogenation reactor 31. Similarly, the extract phase from tower 23, withdrawn from tower 25, may be transferred through line 21, with which it connects, into reactor 31 via line 30. In tower 31 the individual or combined liquid extract phases are subjected to selective hydrogenation at temperatures varying between about 75° F. and about 575° F. and at pressures varying between about 15 and about 2000 pounds per square inch absolute, in the presence of at least one hydrogenation catalyst (shown in the drawing by a broken section represented by reference numeral 32), preferably one or more hydrogenation catalysts comprising metals having an atomic number greater than 23, in order to convert aldehydes to alcohols without substantial hydrogenation of ketones or of any of the aforementioned oxygenated compounds present. Hydrogen thus employed is introduced into reactor 31 through line 33.

As previously indicated, individual hydrogenation catalysts or mixtures comprising hydrogenation catalysts, and preferably hydrogenation catalysts comprising a metal having an atomic number greater than 23, have been found to produce best results when used within the previously stated narrow definite limits in the aforementioned broad ranges of temperature and pressure, in selectively hydrogenating the aldehydes to alcohols in the presence of ketones, without effecting substantial hydrogenation of the latter. The following table shows the approximate data obtained when a catalyst comprising copper oxide and chromium oxide in the ratio of 1:2, and a catalyst comprising iron, both catalysts being in the fixed-bed states, are employed under varying conditions in selectively hydrogenating aldehydes to alcohols present in the mixture introduced into tower 31 through line 30, without substantially hydrogenating ketones present.

Table

| Catalyst | Copper Oxide and Chromium Oxide | | | | Iron |
|---|---|---|---|---|---|
| Pressure, p. s. i. | 400 | 500 | 500 | 500 | 500 |
| Temperature, °F. | 215 | 216 | 250 | 450 | 350 |
| Aldehyde Hydrogenation, wt. per cent | 58 | 92 | 95 | 95 | 91 |
| Ketone Hydrogenation, wt. per cent | 0 | 0 | 77 | 90 | 3 |

From the above table, the complete selectivity of the copper oxide-chromium oxide catalysts in hydrogenating aldehydes to alcohols without simultaneous substantial hydrogenation of ketones present, is exemplified at the indicated temperatures of approximately 215° F. and at a pressure between about 400 and about 500 pounds per square inch absolute. Similarly, the substantially complete selectivity of the iron catalyst will also be apparent when employed at a temperature of approximately 350° F. and at a pressure of about 500 pounds per square inch absolute. On the other hand, the non-selectivity of the copper oxide-chromium oxide catalyst will be noted when the hydrogenation temperature is raised to the range from about 250° F. to about 450° F. when the pressure of approximately 500 pounds per square inch absolute is retained. Hence, when the pressure is lowered below 500 pounds per square inch absolute, a higher temperature range may be utilized.

The effluent from reactor 31 comprises a mixture of alcohols, ketones, esters, and acids, and may also contain varying quantities of the respective treating agents introduced into towers 19 and 23. This mixture is withdrawn through line 34 and if desired, may next be subjected to further hydrogenation in order to convert ketones, esters, and acids present to alcohols by conventional methods. For this purpose, the aforementioned mixture may be transferred from line 34 into a hydrogenation reactor 35, through line 21 with which line 34 connects. Hydrogen employed in reactor 35 is introduced through line 36. The effluent from reactor 35, comprising alcohols and possibly some quantities of the aforementioned treating agents is withdrawn through line 37 for further use or treatment outside the scope of the present process.

As previously indicated, the extracts from towers 19 and 23 may be subjected to selective hydrogenation either individually or combined. Where these extracts are hydrogenated individually, it may be desirable to recover, prior to hydrogenation, the methanol treating agent or any hydrocarbon-insoluble alcohol used as a treating agent, from the extract withdrawn from tower 19 through line 21. In such event, this extract may be transferred from line 21 via line 38 to a stripper 39. Stripper 39 is operated under conditions of temperature and pressure effective to distill overhead the methanol treating agent which is withdrawn through line 40. Bottoms from stripper 39, comprising a mixture of aldehydes, ketones, alcohols, esters, and acids are withdrawn through line 41 and may be transferred into line 30, via line 21, for further treatment in the process hereinbefore described. On the other hand, it may be desirable to separate the methanol treating agent following aldehyde hydrogenation to alcohols. Where such is the case, the aforementioned mixture comprising alcohols, ketones, esters, and acids in line 34 is transferred through line 42 with which line 34 connects to a stripper 43. Stripper 43 is operated under conditions of temperature and pressure effective to distill overhead the methanol treating agent which is withdrawn through line 44. Bottoms from stripper 43 comprising a mixture of the aforementioned compounds, methanol-free, are withdrawn through line 45 and may be transferred into line 21, via line 34, for further treatment in the process hereinbefore described.

Similarly, it may be desirable to recover the water-insoluble solvent treating agent, such as pentane, prior to hydrogenation, from the extract withdrawn from tower 23 through line 25. Accordingly, this extract may be transferred from line 25 via line 46 to a stripper 47. Stripper 47 is operated under conditions of temperature and pressure effective to distill overhead the pentane treating agent, which is withdrawn through line 49. Bottoms from tower 47, comprising a mixture of the aforementioned oxygenated compounds, pentane-free, are withdrawn through line 49 and may be transferred into line 30 with which line 49 connects, for subsequent selective hydrogenation of aldehydes to alcohols in reactor 31, in the process hereinbefore described.

As previously stated, the process of this invention is particularly directed to a method for the selective hydrogenation of aldehydes to alcohols in the presence of ketones, wherein these aldehydes and ketones are obtained as products from the catalytic hydrogenation of oxides of carbon. However, while the invention has been described as having a particular applicability to the selective hydrogenation of aldehydes to alcohols in the presence of ketones obtained from the source indicated, it should be noted that the process of the invention may also be successfully applied to the selective hydrogenation of aldehydes to alcohols present in any mixtures of the aforementioned compounds without regard to the source from which these mixtures may have been derived.

Having thus described my invention, what I claim and desire to secure by Letters Patent is:

1. A method for producing alcohols which comprises subjecting a mixture comprising an aldehyde and a ketone to selective hydrogenation at a temperature between about 200° F. and about 225° F. and at a pressure between about 300 and about 500 pounds per square inch absolute in the presence of a hydrogenation catalyst comprising a mixture of copper oxide and chromium oxide in a ratio of about 1:2 to convert said aldehyde to an alcohol without substantial hydrogenation of said ketone.

2. In a process for the catalytic hydrogenation of an oxide of carbon in which is obtained a liquid phase containing an aldehyde and a ketone, the method of producing alcohols from said phase which comprises the steps of subjecting said phase to extraction treatment with a solvent for oxygenated organic compounds to obtain an extract phase containing said aldehyde and ketone, and subjecting said extract phase to selective hydrogenation at a temperature between about 200° F. and about 225° F. and at a pressure between about 300 and about 500 pounds per square inch absolute in the presence of a hydrogenation catalyst comprising a mixture of copper oxide and chromium oxide in a ratio of about 1:2 to convert said aldehyde to an alcohol without substantial hydrogenation of said ketone.

3. In a process for the catalytic hydrogenation of an oxide of carbon in which is obtained a hydrocarbon-rich phase containing an aldehyde and a ketone, the method of producing alcohols from said phase which comprises the steps of subjecting said phase to extraction treatment with a hydrocarbon-insoluble alcohol to obtain an extract phase containing said aldehyde and ketone, and subjecting said extract phase to selective hydrogenation at a temperature between about 200° F. and about 225° F. and at a pressure between about 300 and about 500 pounds per square inch absolute in the presence of a hydrogenation catalyst comprising a mixture of copper oxide and chromium oxide in a ratio of about 1:2 to convert said aldehyde to an alcohol without substantial hydrogenation of said ketone.

4. In a process for the catalytic hydrogenation of an oxide of carbon in which is obtained a water-rich phase containing an aldehyde and a ketone, the method of producing alcohols from said phase which comprises the steps of subjecting said phase to extraction treatment with a relatively low-boiling hydrocarbon to obtain an extract phase containing said aldehyde and ketone, and subjecting said extract phase to selective hydrogenation at a temperature between about 200° F. and about 225° F. and at a pressure between about 300 and about 500 pounds per square inch absolute in the presence of a hydrogenation catalyst comprising a mixture of copper oxide and chromium oxide at a ratio of about 1:2 to convert said aldehyde to an alcohol without substantial hydrogenation of said ketone.

5. In a process for the catalytic hydrogenation of an oxide of carbon in which are obtained a hydrocarbon-rich phase and a water-rich phase and in which each phase contains an aldehyde and a ketone, the method of producing alcohols from said phases which comprises the steps of separately subjecting said hydrocarbon-rich phase to extraction treatment with a hydrocarbon-insoluble alcohol to obtain an extract phase containing aldehyde and ketone, separately subjecting said water-rich phase to extraction treatment with a relatively low-boiling hydrocarbon to obtain an extract phase containing aldehyde and ketone, combining said extract phases, and subjecting said combined extract phases to selective hydrogenation at a temperature between about 200° F. and about 225° F. and at a pressure between about 300 and about 500 pounds per square inch absolute in the presence of a hydrogenation catalyst comprising a mixture of copper oxide and chromium oxide in a ratio of about 1:2 to convert said aldehydes to alcohols without substantial hydrogenation of said ketone.

6. A method in accordance with claim 5 wherein said hydrocarbon-insoluble alcohol is methanol.

7. A method in accordance with claim 5 wherein said hydrocarbon-insoluble alcohol is ethanol.

8. A method in accordance with claim 5 wherein said hydrocarbon-insoluble alcohol is propanol.

9. A method in accordance with claim 5 wherein said relatively low-boiling hydrocarbon is propane.

10. A method in accordance with claim 5 wherein said relatively low-boiling hydrocarbon is butane.

11. A method in accordance with claim 5 wherein said relatively low-boiling hydrocarbon is pentane.

HENRY G. McGRATH.

REFERENCES CITED

The following references are of record in the file of this patent:

UNITED STATES PATENTS

| Number | Name | Date |
|---|---|---|
| 1,684,640 | Schmidt | Sept. 18, 1928 |
| 1,870,816 | Lewis | Aug. 9, 1932 |
| 2,083,125 | Scheuble | June 8, 1937 |
| 2,171,324 | Zelzsche | Aug. 29, 1939 |
| 2,205,184 | Woodhouse | June 18, 1940 |
| 2,287,092 | Duftschmidt | June 23, 1942 |

OTHER REFERENCES

Adkins: "Reactions of Hydrogen," 1937, U. of Wisconsin Press, pages 18, 50, and 138.